United States Patent [19]

Storholm et al.

[11] Patent Number: 5,505,139
[45] Date of Patent: Apr. 9, 1996

[54] EXECUTIVE AUTO DESK

[76] Inventors: Donald S. Storholm; Sharon M. Storholm, both of 215 W. 102nd St., Bloomington, Minn. 55420

[21] Appl. No.: 148,369

[22] Filed: Nov. 8, 1993

[51] Int. Cl.⁶ .................................................. A47B 23/00
[52] U.S. Cl. ............................................................ 108/44
[58] Field of Search .................. 108/42, 44; 312/235.8; 297/140, 135

[56] References Cited

U.S. PATENT DOCUMENTS

| | | | |
|---|---|---|---|
| 2,833,608 | 5/1958 | Tobias | 108/44 |
| 3,279,872 | 10/1966 | Howke | 312/235.8 |
| 3,632,158 | 1/1974 | Boothe | 108/44 |
| 3,828,994 | 8/1974 | Hollins | 108/44 |
| 3,859,931 | 1/1975 | Lalonde . | |
| 3,922,973 | 12/1975 | Sturgeon . | |
| 3,951,486 | 4/1976 | Tracy . | |
| 4,052,944 | 10/1977 | Jennings . | |
| 4,619,386 | 10/1986 | Richardson . | |
| 4,832,241 | 5/1989 | Radcliffe | 108/44 |
| 4,909,159 | 3/1990 | Gonsoulin | 108/44 |
| 5,170,720 | 12/1992 | Scheurer | 108/44 |

*Primary Examiner*—Kenneth J. Dorner
*Assistant Examiner*—Gerald A. Anderson

[57] ABSTRACT

A portable desk is provided for use in a vehicle which is easily removable and conveniently positioned for use by the operator of the vehicle. The desk has compartments for storage of items and papers and support structures for securing the desk to a seat and for supporting the desk on a seat of the vehicle and on the floor of the vehicle.

4 Claims, 1 Drawing Sheet

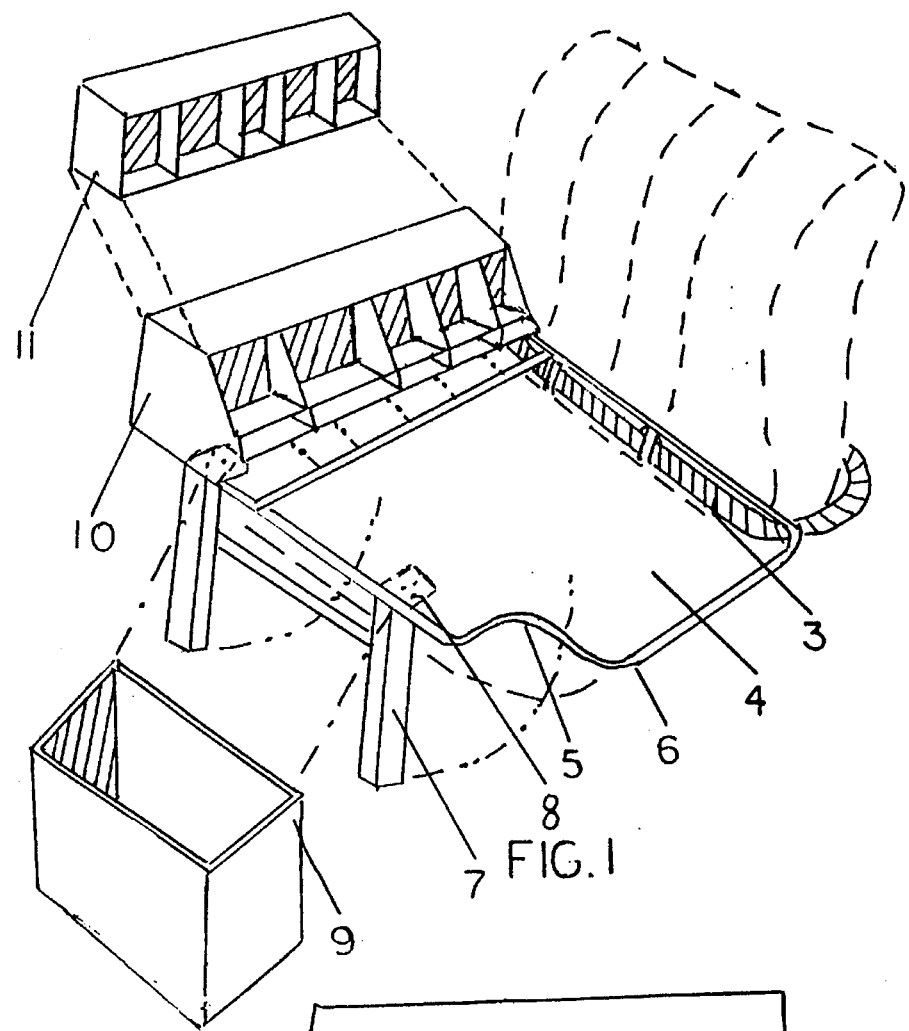
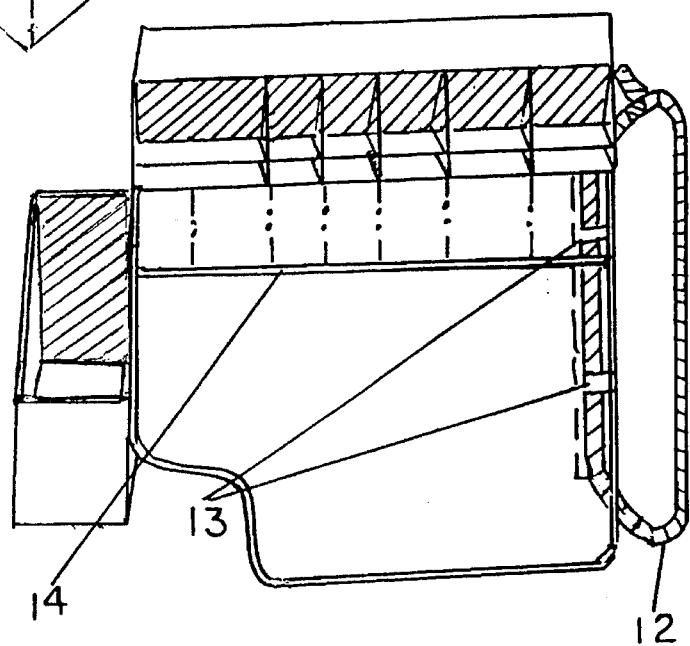

EXECUTIVE AUTO DESK

BACKGROUND OF INVENTION

1. The field of this invention relates to the general field of a portable desk unit for use in a vehicle, specifically to an improved, more convenient easily removable auto desk which features open, easily accessible storage and filing areas and, in addition, unit can be quickly removed and stored elsewhere.

2. Background—description of prior art

Many businessmen, especially those involved in home improvement sales and construction work, find it necessary to work from their vehicles each day. Bids must be left with the homeowner or property owner at the same time as the sales call. This necessitates writing and drafting documents while in the vehicle. While the need for a mobile office has been partially recognized by prior art, unresolved shortcomings still remain such as lack of open, easily accessible storage areas, lack of a simple way to remove and store the unit, as well as other needs which are fulfilled by the applicants submission.

PRIOR ART

U.S. Pat. No. 4,052,944 by Jennings discloses a portable shuffle desk which can be used on the lap of the owner or on other uneven surfaces by adjusting pellets in bottom portion to fit contour. This could be utilized in a vehicle by the driver (if placed on the passenger side), but provides no storage or room for supplies. Thus, it would be of very little use to the businessman who wanted desk-type convenience from the driver position. No provision is provided for securing apparatus into seat to prevent possible injury in case of an accident. Applicant's invention solves a different problem than the reference, and such different problem is recited in the claims.

U.S. Pat. No. 3,951,486 by Tracy discloses such a portable desk/briefcase, but it is lacking a large work area that is so necessary when working with rulers, calculators, etc. The organizer file featured in this desk/briefcase is positioned on the back rest of the passenger seat, causing possible obstruction to the right arm when drawings, sketches, or contracts are being written. In addition, no convenient area for a portable telephone or computer is available. All storage is inside the briefcase and inconveniently located. Applicant's invention solves a different problem than the reference, and such different problem is recited in the claims. Applicant's invention utilizes a new principle of operation. Applicant has blazed a trail, rather than followed one and the applicant's invention solves a long-felt, long existing, but unresolved need.

U.S. Pat. No. 3,922,973 by Sturgeon discloses an auto desk, which features an enclosed chamber. This application would be unhandy for most businessmen who do bids and contracts at a customer's home site because it necessitates opening up the cover each time materials are needed, instead of having them easily accessible. There is no openly accessible filing area for larger items, instead they must stored sideways inside the box portion. The problem solved by the applicant's invention that features easily accessible open storage areas has not hereto been addressed and the recognition of an unrecognized problem mitigates in favor or patentability.

U.S. Pat. No. 4,619,386 by Richardson discloses a vehicle desk container which mounts to the dash board. It provides electrical connections and lighting, but not an adequate, conveniently located work surface that would meet the needs of many businessmen, nor does it provide easily accessible storage. Applicant's invention solves a different problem than the reference, and such different problem is recited in the claims.

U.S. Pat. No. 3,859,931 by Lalonde discloses a foldable table unit for an automobile that is secured at the roof of the vehicle. Here, again, the storage is in a chamber and not easily accessible to the driver when the desk top is in use. Assembling and securing the unit in the vehicle could be time consuming. Storage area needs to be opened and closed each time an item is removed or replaced. The problem solved by the applicant's invention which features easily accessible open storage areas has not hereto been addressed and the recognition of an unrecognized problem mitigates in favor or patentability.

U.S. Pat. No. 4,909,159 by Gonsoulin discloses an automobile computer desk. It is designed mainly to provide a means to secure and manipulate a computer that is placed in the passenger side of the vehicle. It lacks a large work area and openly accessible storage areas are featured. No provision for securing apparatus into seat to prevent movement in case of accident is provided. Applicant's invention solves a different problem than the reference, and such different problem is recited in the claims.

U.S. Pat. No. 3,279,872 by Howke discloses an apparatus that is to be used in a vehicle, but appears cumbersome and time consuming to mount in the vehicle. The top of the work area appears higher than convenient for writing and must be cleared off in order to gain access to the storage areas underneath and thus, would prove inconvenient for the user. Applicant's invention utilizes a new principle of operation. Applicant has blazed a trail, rather than followed one.

U.S. Pat. No. 4,832,241 by Radcliffe discloses an apparatus that is to be used in the passenger side of the vehicle, but the filing area is located near the back rest position and if a person were right handed, it would be difficult to access documents stored in this area. Much of the storage area is not open or conveniently located and require pulling out trays or moving aside the desk top in order to gain access. If apparatus is holding beverage containers, these must be removed and then the table cover section must be pulled from it's storage slot in order to create a work area. The shifting of parts that is necessary to create a work surface would prove unhandy and inconvenient.

U.S. Pat. No. 3,632,158 by Boothe discloses an apparatus designed mainly to utilize electronic equipment. While a work surface is incorporated into the design, in order to gain access to the storage areas, the user must remove all documents and raise the lid. No means of securing the apparatus into the seat to prevent movement in case of an accident is shown. The problem solved by the applicant's invention, which features easily accessible open storage areas, has not hereto been addressed and the recognition of an unrecognized problem mitigates in favor or patentability.

U.S. Pat. No. 2,833,608 by Tobias discloses a work table apparatus that features no storage areas and is made to be attached to an automobile bumper. Clearly this apparatus would not benefit a user who is working from the inside of his vehicle. Applicant's invention solves a different problem than the reference, and such different problem is recited in the claims.

BRIEF SUMMARY: EXECUTIVE AUTO DESK

A portable, easily removable work surface unit with a plurality of easily accessible open storage areas for use in a vehicle. Placement of desk is on passenger seat. Base and writing area of unit can be constructed larger or smaller to fit the size of the vehicle. A telephone/floor shift allowance curve is incorporated into the design and an open storage areas are located near the passenger side door that features an adjustable stop bar. The unit is supported by a base and adjustable legs. Catch edges are provided to contain objects on the desktop. A removable filing area is attached to unit in front of passenger seat. Unit is secured into passenger seat by use of a cinch strap that passes through two metal grips on the passenger back rest side of the supporting base, then around the back of the seat and locks into the other end of the cinch strap at the beginning point.

BRIEF DESCRIPTION OF DRAWINGS 1 and 2

FIG. 1:

Perspective view of a basic executive auto desk. The work surface 4 is large enough to provide ample room for the user and features a telephone/floor shift allowance curve 5 in order to provide easy access to shift a manual transmission or reach for a floor mounted cellular telephone. Work surface 4 has an attached catch edge molding 6 on three sides in order to contain small objects that may fall to the seat or floor. Work surface 4 is supported by a base 3 near the passenger seat backrest. Base is attached to the work area by means of screws or other means. Open storage refit 10 is attached with screws or other means and is located near the passenger side door with storage area opening towards the driver. Storage unit 10 is basically several small compartments with divisions placed as the user desires. Adjustable stop bar 14 is available to help contain small items on the desk top. Additional storage area 11 is available and can be top loading if desired. Adjustable, foldable legs 7 are located on the dash board side of the executive auto desk in order to provide front end support and stability for the unit. These are attached with hinges 8 and can easily be folded underneath when removing the executive auto desk from the vehicle. Mounted filing area 9 can be attached unit if access to additional papers, contracts, or other objects is needed.

FIG. 2:

Discloses the executive auto desk from the driver's perspective and illustrates the placement of the metal grips 13 and safety belt 12 that secure the unit into place as well as adjustable stop bar 14.

| Reference Numerals: | |
| --- | --- |
| 3 Base Support | 9 Mounted file |
| 4 Work surface | 10 Open or closed storage area |
| 5 Phone/gear shift allowance | |
| 6 Catch edge molding | 11 Additional open or closed storage area |
| 7 Folding, adjustable hinged legs | |
| | 12 Safety Strap |
| 8 Hinges | 13 Metal Grips |
| | 14 Adjustable stop bar |

BEST MODE FOR CARRYING OUT THE INVENTION (a) Work surface

To provide a wooden, plastic or metal work surface that can be of various sizes and is designed for use in a motor vehicle to hold a variety of objects and devices, such as calculators, rulers, pens, pencils, cellular phones, computers, telephone books, contracts, and any other supplies needed to fulfill the owner's business or personal needs. Open storage areas for these items is located parallel and next to the passenger door, facing the driver. As a result, fast and easy accessibility is provided which is an improvement over prior art submissions designed for vehicular use. Work surface is large enough to provide ample arm room when working at the executive auto desk.

(b) Telephone/floor shift allowance curve

To provide a curve in the corner nearest the steering wheel to accommodate a manual transmission gear shift or a portable telephone which is mounted on the floor or dash board instead of being contained in a part of the executive auto desk storage area. With this feature, the executive auto desk will work equally as well in standard transmission or automatic transmission vehicles. Also, the owner of a cellular phone who chooses to keep his telephone mounted on the dash board or floor will have adequate room to reach it. Previous inventions have not adequately considered the need for convenient telephone storage and access. In addition, more work space is provided near the driver which would be lost if the edge was cut straight across and the curve eliminated.

(c) Storage area/shelving for tools and supplies

To provide easily accessible, adjustable storage compartments to house whatever items are desired by the owner. Storage unit is attached to work area by means of screws or other attachments. These storage compartments are located parallel and next to the passenger door and open toward driver. A second, optional storage unit can access from the top if desired. The basic advantage over other previous inventions is that the storage is open or closed and objects can be easily reached within a few seconds. Searching through a closed container or box to find something you would like on the bottom is no longer necessary.

(d) Base support to provide stability

To provide a wooden or plastic or metal base located under the work area near the passenger seat backrest which can be covered with a padded material for wear protection. This base, attached to the main unit with screws or other means, supports and levels the unit, as well as preventing it from tipping backwards when in use.

(e) Foldable, adjustable legs for easy removal and storage

To provide wooden or plastic or metal legs, the purpose of which is to hold the executive auto desk level on the seat. Front legs extend to the floor to provide additional support near the dash board side of the executive auto desk and are hinged at the top to fold underneath for easy storage of the unit. This feature makes the executive auto desk very portable and easily removed for placement in another area.

(f) Catch edge to retain small articles

To provide a raised edge along three sides of the executive auto desk to help prevent pencils, pens, and other materials from rolling to the seat or floor area where retrieval may be difficult.

(g) Adjustable stop bar

To provide an adjustable stop bar which helps prevent items in the lower storage area from sliding out on to the work surface when the vehicle is in motion. The stop bar can be easily moved forward or back to suit the user's needs.

(h) Mounted filing area

To provide a wood, metal or plastic filing and storage area which can be attached on the dash board side of the unit. No cumbersome boxes, backrest mounted files, or unhandy storage in the back seat is necessary. Papers are right at the user's fingertips.

(i) Securing—safety feature

To provide a means to secure the executive auto desk into the passenger seat with the use of a safety strap that passes through two metal grips on the lower passenger back rest side of the supporting base. It then continues around the back side of the passenger seat and locks into the other end of the safety strap at the beginning point.

(j) Durability of construction

To provide a long lasting and well constructed desk for the individual who works from his or her vehicle Further objects and advantages of our invention will become apparent from a consideration of the drawings and ensuing description.

We claim that:

1. An auto desk in combination with a vehicle having a passenger seat comprising:

a flat working surface having a circumferential edge having several sides, a top surface and a bottom surface, said bottom surface supported by a seat having a back rest in said vehicle, at least one first storage container with at least one moveable closure to close or open said container, said first container attached to a first side of said work surface positioned adjacent to a door of said vehicle, a second storage container attached to a second side of said work surface adjacent a side of said seat opposite said back rest, said second storage container extending below the bottom wall of said work surface, said second storage space sized to store at least papers, a catch edge mounted to said edge of said work surface and, with said first container, surrounds said work surface to retain items on said work surface, a pair of legs hinged to said bottom of said work surface along said second side of said work surface which overhangs said seat, said legs engaging a floor of said vehicle to support said work surface, a support base extending from said bottom along a third edge of said work surface adjacent said seat back rest, grips attached to said base having apertures, and a strap passing through said apertures and releasably securing said work surface to said seat.

2. The work surface of claim 1 further including: a stop bar for securing items in one of said storage containers or to secure items on said work surface.

3. The desk of claim 1 further including in the first storage container a plurality of compartments.

4. The desk of claim 1 further including in said work surface a curved edge providing clearance for gear shifts or cellular phones mounted to said floor.

\* \* \* \* \*